(12) United States Patent
Lin et al.

(10) Patent No.: US 11,186,765 B2
(45) Date of Patent: *Nov. 30, 2021

(54) DELAYED GELLING AGENTS

(71) Applicants: ConocoPhillips Company, Houston, TX (US); University of Kansas, Lawrence, KS (US)

(72) Inventors: Ying-Ying Lin, Lawrence, KS (US); Cory Berkland, Lawrence, KS (US); Jenn-Tai Liang, College Station, TX (US); Ahmad Moradi-Araghi, Bixby, OK (US); Terry M. Christian, Bartlesville, OK (US); Riley B. Needham, Bartlesville, OK (US); James H. Hedges, Bartlesville, OK (US); Min Cheng, Bartlesville, OK (US); Faye L. Scully, Bartlesville, OK (US); David R. Zornes, Bartlesville, OK (US)

(73) Assignees: CONOCOPHILLIPS COMPANY, Houston, TX (US); UNIVERSITY OF KANSAS, Lawrence, KS (US)

( * ) Notice: Subject to any disclaimer, the term of this patent is extended or adjusted under 35 U.S.C. 154(b) by 224 days.

This patent is subject to a terminal disclaimer.

(21) Appl. No.: 16/152,557

(22) Filed: Oct. 5, 2018

(65) Prior Publication Data

US 2019/0071598 A1    Mar. 7, 2019

Related U.S. Application Data

(63) Continuation of application No. 14/060,749, filed on Oct. 23, 2013, now Pat. No. 10,093,848.

(Continued)

(51) Int. Cl.
| | | |
|---|---|---|
| *C09K 8/035* | (2006.01) | |
| *C09K 8/60* | (2006.01) | |
| *C09K 8/584* | (2006.01) | |

(52) U.S. Cl.
CPC .............. *C09K 8/604* (2013.01); *C09K 8/035* (2013.01); *C09K 8/584* (2013.01); *C09K 2208/10* (2013.01)

(58) Field of Classification Search
CPC .... C09K 2208/10; C09K 8/035; C09K 8/584; C09K 8/604; C09K 2208/22; (Continued)

(56) References Cited

U.S. PATENT DOCUMENTS 4,773,481 A    9/1988 Allison et al.
6,476,169 B1    11/2002 Eoff et al.
(Continued)

FOREIGN PATENT DOCUMENTS

EP    2607405    6/2013
WO    2008112009    9/2008
(Continued)

OTHER PUBLICATIONS

Jiang et al, Optimized dextran-polyethylenimine conjugates are efficient non-viral vectors with reduced cytotoxicity when used in serum containing environments, International Journal of Pharmaceutics, 427, 2012, 71-79 (Year: 2012).*

(Continued)

*Primary Examiner* — Alicia Bland
(74) *Attorney, Agent, or Firm* — Boulware & Valoir

(57) ABSTRACT

The disclosure is directed to polyelectrolyte complex nanoparticles that can be used to deliver agents deep into hydrocarbon reservoirs. Methods of making and using said polyelectrolyte complex nanoparticles are also provided.

20 Claims, 11 Drawing Sheets

Related U.S. Application Data

(60) Provisional application No. 61/757,276, filed on Jan. 28, 2013.

(58) Field of Classification Search
CPC .... C09K 2208/32; C09K 8/524; C09K 8/528; C09K 8/588; E21B 43/16
See application file for complete search history.

(56) References Cited

U.S. PATENT DOCUMENTS

| | | | |
|---|---|---|---|
| 7,091,160 | B2 | 8/2006 | Dao et al. |
| 7,644,764 | B2 | 1/2010 | Berkland |
| 8,183,184 | B2 * | 5/2012 | Berkland ............... C09K 8/536 507/211 |
| 8,372,786 | B2 * | 2/2013 | Berkland ............... C09K 8/516 507/90 |
| 10,316,242 | B2 * | 6/2019 | Duenckel ............. E21B 43/267 |
| 2008/0058229 | A1 * | 3/2008 | Berkland ............... C09K 8/706 507/211 |
| 2008/0223578 | A1 | 9/2008 | Berkland |
| 2008/0269083 | A1 | 10/2008 | Argillier |
| 2010/0056399 | A1 * | 3/2010 | Berkland ................ C09K 8/60 507/201 |

FOREIGN PATENT DOCUMENTS

| | | |
|---|---|---|
| WO | 2010138837 | 5/2010 |
| WO | PCT/US13/66288 | 5/2014 |

OTHER PUBLICATIONS

Johnson S., Trejo J., Veisi M., Willhit G. P., Liang J., Berkland C., Journal of Applied Polymer Science, 2010, 115, 1008-1014.

Alhajeri et al., "Gel-polymer extends Arbuckle high-water-cut well life" Oil & Gas Journal, 2006.

Avery et al. "Field evaluations of a new gelant for water control in production wells", SPE 18201, 1988.

Bragonzi et al., Gene Therapy, 1996, 6, 1995-2004.

Brownlie et al., Int. J. Pharm., 2004, 274, 41-52.

Chauveteau et al., "Controlling In-Situ Gelation of Polyacrylamides by Zirconium for water Shutoff", SPE 50752, 1999.

Chiappa et al., J. Petrol. Sci. and Eng., 1999, 24, 113-122.

Cordova, Macromolecules, 2008, 41, 4398-4404.

Dovan "Delaying gelation of aqueous polymers at elevated temperatures using novel organic crosslinkers," SPE 37246, 1997.

Goula et. al., Gene Therapy, 1998, 5, 1291-1295.

Koch et al., "Field performance of new technique for control of water production or injection in oil recovery," SPE 2847, 1970.

Leslie et al., J. Petrol. Sci. and Eng., 2005, 46, 225-232.

Olsen, "Case history: water shutoff treatment in the phosphoria formation, Hot Springs County, Wyoming," SPE 15163, 1986.

Omari, Polymer, 1995, 36(22), 4263-4265.

Rifkin, Environmental Science and Technology, 2004, 267A-271A.

Sydansk, "Field testing of a new conformance-improvement-treatment Chromium(III) gel technology," SPE 17383 (1998).

Willhite et al., "Controlling water production using gelled polymer systems," SPE 89464 (2008).

Hongtao et al., J. Controlled Release, 2006, 114, 100-109.

Jiang Dahai et al: "Optimized dextran-polyethylenimine conjugates are efficient non-viral vectors with reduced cytotoxicity when used in serum containing environments", International Journal of Pharmaceutics, (2012) vol. 427, No. 1 , pp. 71-79.

Yuting Wen et al: "A Biodegradable Low Molecular Weight Polyethylenimine Derivative as Low Toxicity and Efficient Gene Vector", Bioconjugate Chemistry., val. 20, No. 2, Feb. 18, 2009 (Feb. 18, 2009), Abstract.

Australia Office Action dated Feb. 18, 2016 issued from Australia Application No. AU2013375229.

Chiappa, L. et al., Role of Polymer Adsorption and of Petrophysical Properties in Water-Cut Control Treatments by Polymer Injection in Gas Wells, 9th European Symposium on Improved Oil Recovery, The Hague, The Netherlands, Oct. 20-22, 1997.

Zhitkovich A., Chromium in Drinking Water: Sources, Metabolism and Cancer Risks, Chemical Research in Toxicology 2005, 18, 3-11.

Hessert, J., Gelled Polymer Technology for Control of Water in Injection and Production Wells, Third Tertiary Oil Recovery Conf., Wichita, KS, 1979, 58-70.

* cited by examiner

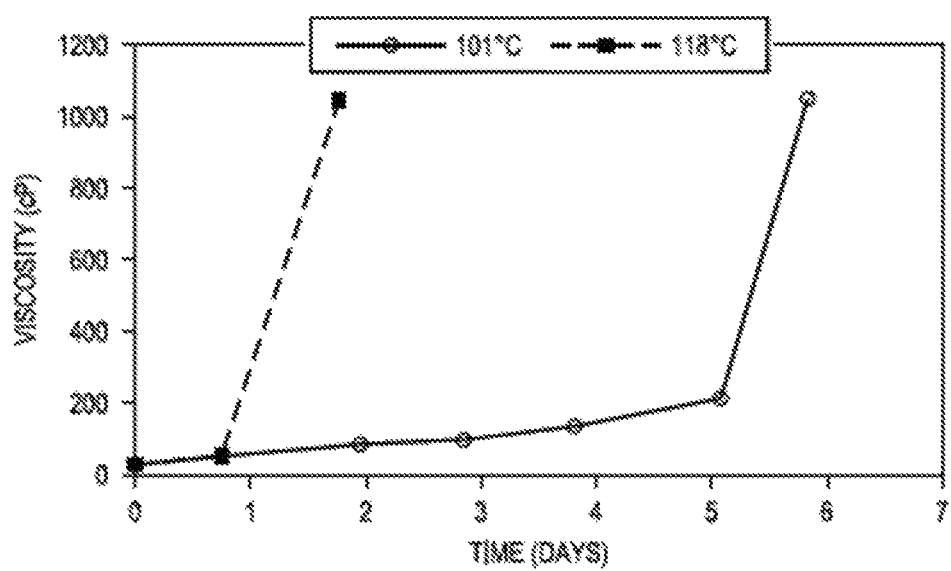

DELAYED GELLING AGENTS

CROSS-REFERENCE TO RELATED APPLICATIONS

This invention is a continuation application of U.S. application Ser. No. 14/060,749, filed on Oct. 23, 2013 and issued on Oct. 9, 2018 as patent Ser. No. 10/093,848, which claims priority to U.S. Provisional Application No. 61/757,276, filed on Jan. 28, 2013. Each of these is incorporated by reference in its entirety herein.

FEDERALLY SPONSORED RESEARCH STATEMENT

Not applicable.

REFERENCE TO MICROFICHE APPENDIX

Not applicable.

FIELD OF THE DISCLOSURE

This disclosure relates to compositions and processes for oil field applications. More specifically, this disclosure relates to polyelectrolyte complex (PEC) nanoparticle systems for controlled release of a cross-linking agent, such as zirconium or PEI, that can be used to mediate a delayed gelling or crosslinking reaction. Such polymers can be applied to improve the performance of secondary and tertiary enhanced oil recovery processes, but can also be used whenever a delayed reaction is needed.

BACKGROUND OF THE DISCLOSURE

The challenge for all oil and gas companies is to produce as much oil as commercially feasible, leaving as little oil as possible trapped and wasted inside the reservoir. During the primary recovery stage, reservoir drive comes from a number of natural mechanisms. These include natural water pushing oil towards the well, expansion of the natural gas at the top of the reservoir, expansion of gas initially dissolved in the crude oil, and gravity drainage resulting from the movement of oil within the reservoir from the upper regions to lower regions where the wells are located. Recovery factor during the primary recovery stage is typically about 5-15% under such natural drive mechanisms.

Over the lifetime of the well, however, the pressure will eventually fall, and at some point there will be insufficient underground pressure to force the oil to the surface. Once natural reservoir drive diminishes secondary and tertiary recovery methods are applied to further increase recovery.

Secondary recovery methods rely on the supply of external energy into the reservoir in the form of injecting fluids to increase reservoir pressure, hence replacing or increasing the natural reservoir drive with an artificial drive. In addition, pumps, such as beam pumps, gas lift assisted pumping and electrical submersible pumps (ESPs), can be used to bring the oil to the surface. Secondary recovery techniques include increasing reservoir pressure by water injection, $CO_2$ injection, natural gas reinjection, and miscible injection (MI), the most common of which is probably water injection. Typical recovery factor from water-flood operations is about 30%, depending on the properties of oil and the characteristics of the reservoir rock. On average, the recovery factor after primary and secondary oil recovery operations is between 35 and 45%.

While secondary recovery techniques are quite effective, the existence of fractures and highly porous or permeable regions reduces their effectiveness. Any gas or liquid that is injected into a well, will naturally travel the least restrictive route, thus bypassing most of the oil in the less porous or permeable regions. Thus, the overall effectiveness of the sweep is reduced by these so-called "thief zones," which channel injection fluid directly to production wells.

In such cases, polymers, foams, gelants, emulsions and the like are injected into the thief zones in order to block these zones, thus diverting the subsequent injection fluids to push previously unswept oil towards the production wells. See e.g., FIG. 1A-B.

Among the polymers used for such purposes, partially hydrolyzed polyacrylamide (HPAM) cross linked with Cr (III) gels have been widely used for water shutoff and sweep improvement in field applications. Polymer gels have been applied in enhanced oil recovery to improve the sweep efficiency, prolong the life of an oil well and maximize the recoverable oil amount by placing the gelants deep into the reservoir and blocking the high-permeability channels.

One of the difficulties with the use of polymers to block thief zones, is the issue of viscosity. Viscous polymers are difficult to pump and, in presence of common crosslinking agents such as chromic acetate, gel too quick to place deep in target zones. For this reason, there is considerable effort directed to delaying the crosslinking of polymers until they have already penetrated deep into the oil bearing reservoir.

The idea of using a polyelectrolyte complex for delaying the release of chromium was reported in previous applications US2008058229 (now U.S. Pat. No. 8,183,184) and US20100056399. Those disclosures were directed to novel compositions for delivering, controlling, and delaying the release of an oil and gas field chemical to a target area. The composition comprised a polyanion and a polycation forming a polyelectrolyte complex, and an oil and gas field chemical associated with the polyelectrolyte complex. The oil and gas field chemical was preferably selected from the group consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and (h) a surfactant.

In this prior work, one such polyelectrolyte complex was exemplified with a crosslinking agent. The polyelectrolyte complex (PEC) nanoparticle was prepared with polyethylenimine (PEI, Mw 25 kDa) and dextran sulfate (DS). The PEC entrapped and controlled the release of Cr(III). Although the gelation time using PEC nanoparticles was greatly extended compared to chromium (III) acetate used alone (280 times slower than that of the control), the gelation time was still too short for reservoir temperatures higher than 40° C. In addition, the use of chromium is prohibited in some countries due to its toxicity. Furthermore, PEI of 25 kDa is also known for its bias of biodistribution and transfection towards the lungs, causing significant toxicity in vitro and in vivo.

In another U.S. Pat. No. 7,644,764 (US2008223578), we also reported on the delayed gelling made possible with a PEC that lacked metal ions. In that application, a solution comprising PEI and dextran sulfate or chitosan and dextran sulfate was preformed. When mixed with varying amounts of the ALCOFLOOD® 935, gel delay of up to 12 days was observed, but the maximum temperature tested was only 40° C.

Thus, what is needed in the art is PEC nanoparticle system that can provide much longer gelation times at higher temperatures, preferably with less toxicity than the prior art PEC nanoparticle system. In the ideal case, the gelant should have low initial viscosity, extended low viscosity period, long gelation time, and abrupt viscosity increase at the end when gelant becomes gel. Furthermore, the gelant should have both positive and negative charges, allowing its uses to be tailored to various conditions and applications.

SUMMARY OF THE DISCLOSURE

The disclosure provides a large variety of compositions for use in delaying crosslinking of gels, as well as downhole and other industrial uses therefore.

In one embodiment, the disclosure provides a composition comprising a polyelectrolyte complex (PEC) nanoparticle comprising a polyalkyleneimine, such PEI and a polyanion, such as a PVS, and having a size of less than one micron. Such microparticles can be intimately associated with a metal ion crosslinker, or not, depending on what application the PEC nanoparticle will be used for. In preferred embodiments, the PEI or other polyalkyleneimine is of a small molecular weight, e.g., less than 2000 D, which is less toxic than larger PEI.

Other embodiments provide a composition for controlling the release of an oil and gas field chemical comprising a polyelectrolyte complex, as herein described, said polyelectrolyte complex associated with an oil and gas chemical selected from the group consisting of a (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and (h) a surfactant.

Other compositions comprise a polyelectrolyte complex nanoparticle comprising a polyethylenimine (PEI) of less than 2000 Da and sodium polyvinyl sulfonate (PVS), either alone or intimately associated with a zirconium or other metal ion crosslinker, said nanoparticle having a size of less than one micron, wherein a said nanoparticle has a predominance of negative charges and the amount of PVS exceeds the amount of PEI. Alternatively, the complex can have net positive charge, and the ratios reversed.

Yet other embodiments provide a delayed gelling composition any of the PEC nanoparticles herein described, plus a polymer that can be crosslinked with said PEI and/or said metal cation crosslinker; and an injection fluid, typically brine, riverwater, seawater, produced fluids and the like.

In another embodiment, the disclosure provides a composition comprising a polyelectrolyte complex nanoparticle comprising a PEI of less than 2000 Da and PVS intimately associated with a zirconium ion crosslinker, said nanoparticle having a size of less than one micron.

The polyanion can be selected from sodium polyvinyl sulfonate (PVS), poly (sodium acrylate), sodium polystyrene sulfonate, copolymers of sodium vinylsulfonate with sodium acrylate or sodium styrene sulfonate, dextran sulfate, and anionic surfactants. However, PVS is a preferred polyanion of demonstrated utility.

The anionic surfactant can be selected from the group consisting of sodium dodecyl sulfate, sodium lauryl sulfate, alcohol propoxy sulfate, olefin sulfonates, alpha olefin sulfonates, and the like.

The metal crosslinker can be any metal or source of metal that can be combined with a polymer for crosslinking, including but not limited to complexed zirconium compounds selected from the group consisting of zirconium acetate, sodium zirconium lactate, zirconium sulfate, zirconium tetrachloride, zirconium orthosulfate, zirconium oxychloride, zirconium carbonate, zirconium ammonium carbonate, zirconium acetylacetonate and mixtures thereof. Zirconium is preferred as less toxic than chromium. Chromium complexes, such as chromium acetate, and the like can also be used, but in some instances will not be preferred due to chromium's toxicity and/or environmental regulations. Alternatively, the metal crosslinker can be a compound selected from the group consisting of aluminum chloride, aluminum sulfate, aluminum citrate, tin chloride, tin sulfate, iron chloride, iron nitrate, titanium chloride, and titanium sulfate.

A preferred size for the PEC nanoparticles is <1 micron, or about 100 to 900 nm in diameter, or 150-300 nm. Larger sizes are also possible for certain applications.

The polymer that is crosslinked with the metal ion crosslinker is a polymer that can be crosslinked with e.g., PEI or metal cations. Examples include partially hydrolyzed polyacrylamide, and other anion or carboxyl group containing polymers. Other examples include a polymer or copolymers of acrylate, acrylamide, N,N-dimethyacrylamide, tert-butyl acrylate, acryamido-2-methylpropane sulfonic acid, sodium 2-acryamido-2-methylpropane sulfonate, or N,N, dimethyl acrylamide. Other examples, include polysaccharides, such as carboxylated guar and the like.

An improved method of sweeping a reservoir is also provided herein, wherein an injection fluid is injected into a reservoir to mobilize and produce oil, the improvement comprising injecting the compositions herein described plus a polymer plus a fluid into a reservoir, aging said composition and polymer and fluid to increase its viscosity, injecting additional injection fluid into said reservoir to mobilize oil, and producing said oil. The aging time can be varied, as described herein, to allow compete penetration of the reservoir.

Typically, a solution of the water-soluble polymer is pumped into the subterranean formation first, followed by water to displace the water soluble polymer from the well bore to thereby prevent premature gelling upon introduction of the polyelectrolyte gelling agent. Thereafter, the polyelectrolyte gelling agent is pumped into the formation. Alternatively, the water-soluble polymer may be pre-mixed with the polyelectrolyte gelling agent before injection.

The nature of the subterranean formation is not critical to the practice of the processes described herein. The delayed gel-forming composition can be injected into said subterranean formation having a temperature range of from about 10° C. to about 180° C. Any means known to one skilled in the art such as, for example, pumps, can be used for injecting said gel-forming composition.

Another embodiment is a method of improving sweep efficiency of a fluid flood of a reservoir, said method comprising injecting the compositions herein described (plus polymer and fluid as needed) into a reservoir; aging the composition, e.g., 7 to 14 days or as needed, to increase its viscosity; injecting an injection fluid into said reservoir to mobilize the oil; and producing said mobilized oil.

We used PEI herein to exemplify the compositions, but PEI variations, such as polyalkyleneimine or a polyalkylenpolyamine can also be used.

We used HPAM herein as an exemplary polymer, but any acrylate based polymer can also be used, provided there are sufficient, unhindered carboxylate groups available for the metal ion crosslinking reaction. Preferred polymers include e.g., acrylamide, tert-butyl acrylate, acryamido-2-methylpropane sulfonic acid, sodium 2-acryamido-2-methylpropane sulfonate (NaAMPS), N,N, dimethyl acrylamide, and copolymers thereof. Other polymers include polysaccharide-based polymers, such as carboxylated guar or carboxymethyl cellulose.

In addition to the PEC nanoparticles, polymers and injection fluids described herein, the injection fluid may also contain other conventional additives including chelating agents to remove polymerization inhibitors, pH adjusters, initiators and other conventional additives, accelerators, retardants, corrosion inhibitors, scale inhibitors, as appropriate for the particular application. In addition, chemicals can be added that will reduce the adsorption of gelation chemicals to the oil reservoir.

As used herein ppm refers to weight ratio in parts per million, based on total weight.

The term "nanoparticle" shall refer to particle, preferably less than about 1000 nanometers in size, even more preferably less than 500 nanometers in size, and still more preferably less than 100 nanometers in size. In one aspect, the size of the nanoparticle ranges from about 50 to 500 nm, and is preferably between about 100 to 300 nm.

The term "polyelectrolyte" refers to a macromolecule, usually a polymer, possessing more than one charge. The term "polyelectrolyte" includes polycations and polyanions.

The term "polymer" refers to a molecule built up by repetitive bonding together of smaller units called monomers. The polymer can be linear, branched network, star, comb, or ladder types of polymer. The polymer can be a homopolymer in which a single monomer is used or can be copolymer in which two or more monomers are used. Types of copolymers include alternating, random, block, and graft.

The term "polycation" refers to a polyelectrolyte possessing net positive charge. While the polycation can contain monomer units that are charge positive, charge neutral, or charge negative, the net charge of the polymer is positive.

The term "polyanion" refers to a polyelectrolyte containing a net negative charge. While the polyanion can contain monomer units that are charge negative, charge neutral, or charge positive, the net charge on the polymer is negative.

The term "polymeric core" shall refer to the inner part of the polyelectrolyte complex.

The term "polymeric shell" or "corona" refers to the outer layer of polyelectrolyte complex.

The term "associated with" means that the oil and gas field chemical is complexed with or partially or completely encapsulated by the polyelectrolyte complex. Thus, the oil and gas field chemical may interact with the exterior or interior surface of the polyelectrolyte complex (e.g. the corona or core).

The term "complex" means the interaction between two molecules or portions of the same molecule through non-covalent interactions such as coordination bonds, electrostatic interactions, hydrogen bonding interactions, and hydrophobic interactions.

The term "partially or completely encapsulate" or "entrap" means that the oil and gas field chemical is partially or completely localized in the interior or center of the polyelectrolyte complex.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| Abbreviation | Meaning |
| --- | --- |
| MTS | (3-(4,5-dimethylthiazol-2-yl)-5-(3-carboxymethoxyphenyl)-2-(4-sulfophenyl)-2H-tetrazolium) |
| PEI | Polyethylenimine |
| RO | Reverse osmosis |
| PVS | poly(vinylsulfonic acid sodium salt) |
| MW | Average molecular weight |
| FB | Field brine |
| SW | Sea water |
| PEC | Polyelectrolyte complex |
| HPAM | Hydrolyzed Poly-Acrylamide, partially hydrolyzed polyacrylamide |
| DS | Dextran sulfate |

BRIEF DESCRIPTION OF THE DRAWINGS

(FIG. 1B).

FIG. 6A-C. Gelation profile for HPAM and PEI 800D PVS-Zr negatively charged PEC at 101° C. and 118° C. in FIG. 6A seawater (SW) and a final Zr in gelant was 100 ppm. In FIG. 6b, at 118° C., final Zr in gelant was 100 ppm in Field brine (FB) and seawater. At 101° C. and 118° C. in FIG. 6C Field brine, final Zr in gelant was 150 ppm. Final concentration of ALCOFLOOD® 935 equals 5000 ppm. Shear rates as in FIG. 3.

DETAILED DESCRIPTION

Figure 1A:
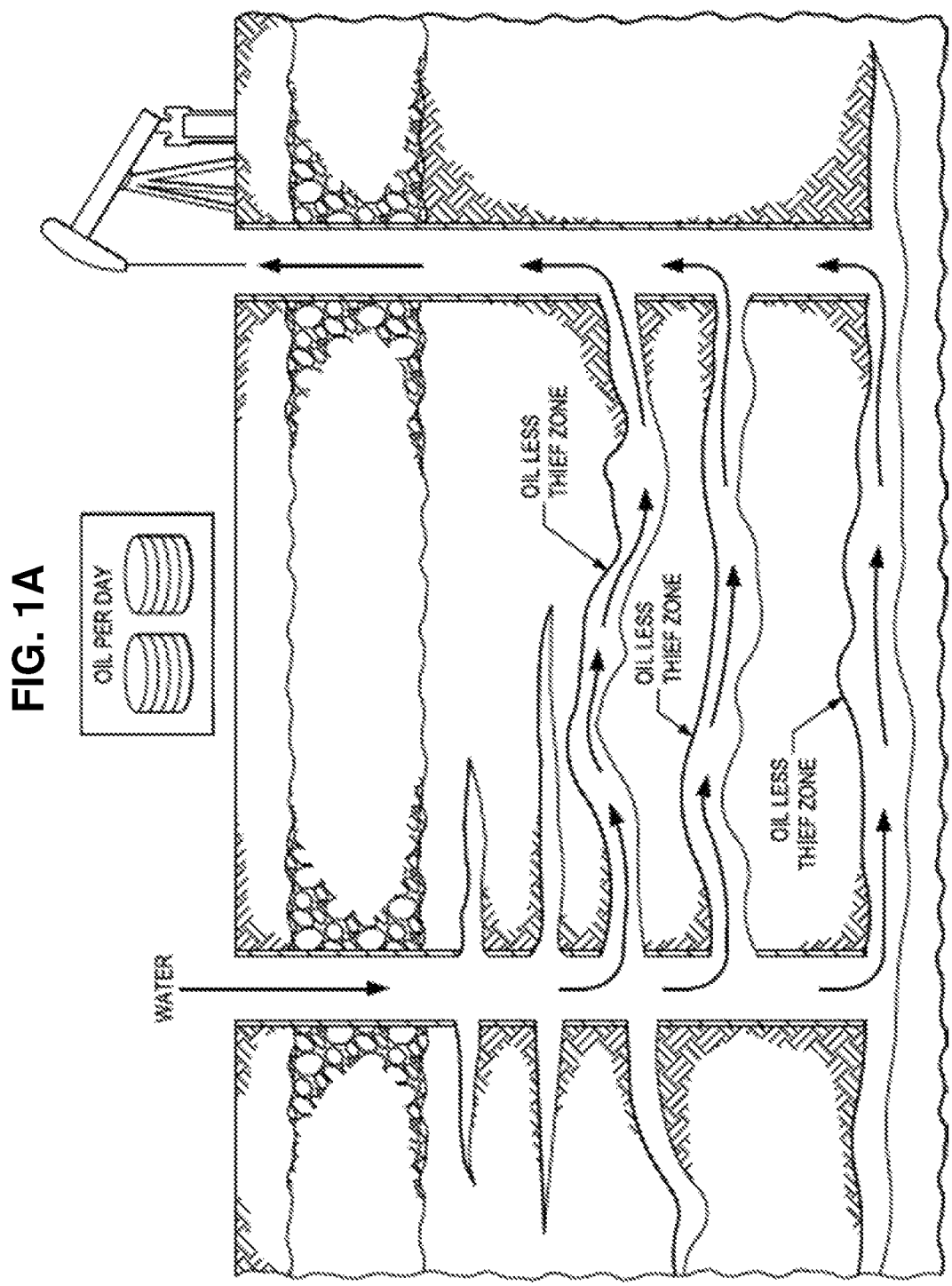
FIG. 1A-B. Water flooding wherein water bypasses oil, travelling the thief zones (FIG. 1A). However, the thief zones can be blocked by polymers, gels, foams, and the like, thus forcing water to sweep the reservoir and producing more of the original oil in place.
Figure 1B:
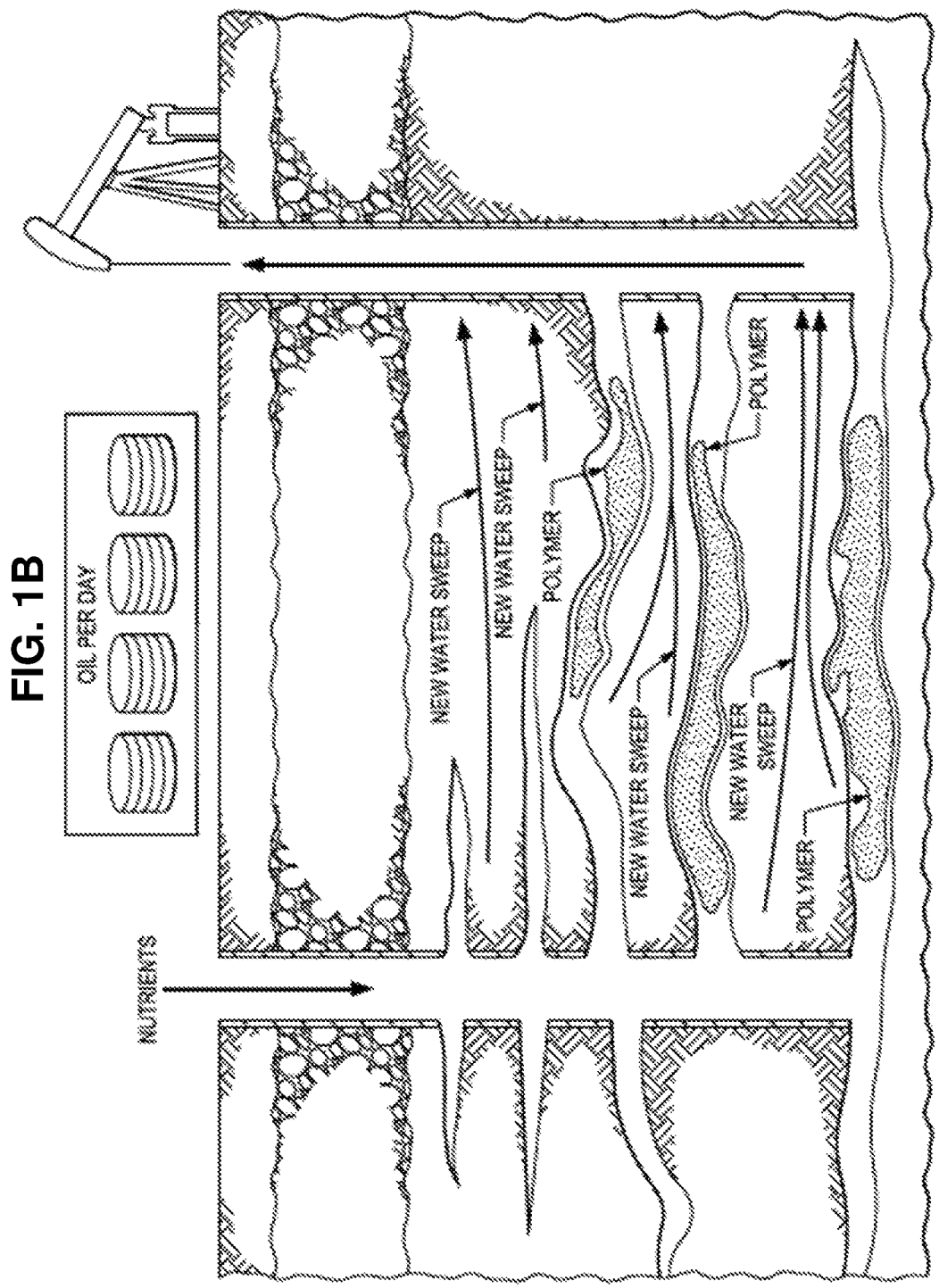

The disclosure provides novel polymers that delay gelling under the conditions typical of water flooding in situ and have particular utility in blocking thief zones of reservoirs, but other uses are possible, especially in the agriculture, remediation and drug delivery arts.

Low molecular weight PEI or PEI derivatives are used, together with an polyanion, and the two together hold multivalent metal ions in a nanoparticle, allowing the gradual release of the multivalent metal ion. These nanoparticles plus a polymer that can be crosslinked with the multivalent metal ion, and an injection fluid are injected into a reservoir. As time passes, multivalent metal ions are released from the nanoparticles and crosslink the polymer. Thus, the multivalent metal ion release (and consequent gel thickening) can be delayed until the injection fluid has reached deep into the reservoir.

As an alternative embodiment, low molecular weight PEI or PEI derivatives are used, together with an polyanion, and the two together will gradually degrade and/or release the PEI, which can also be used for crosslinking.

PRIOR ART

In this prior art example from US2010056399, the delayed viscosity increase was demonstrated using the nanoparticles loaded with chromium prepared according to the following:

The nanoparticles with Cr (III) as the oil and gas field chemical were prepared at room temperature. About 59.0 g of a dextran sulfate (Mw=500 kDa, Fisher Scientific) aqueous solution (10,000 ppm) were added drop wise to about 133.0 g of a polyethylenimine (Mw=25 kDa, Aldrich) aqueous solution (10,000 ppm), which was continuously stirred. After stirring for about 15 minutes at 350 rpm, 0.46 g of $CrCl_3 \cdot 6H_2O$ (Mw=266.45 kDa, Fisher Scientific) was added and the resulting nanoparticles were stirred for about 30 minutes at about 350 rpm.

The nanoparticles were washed 24 hours in the dark by dialysis against a 5% w/v D-mannitol aqueous solution, and 24 hours more against a fresh 2.5% w/v D-mannitol solution using a Spectra/Por CE dialysis membrane with a molecular weight cutoff of 10,000 Daltons. The purified, Cr(III) loaded nanoparticle solution was frozen for about two hours at −70° F. before being lyophilized at 0.024 Torr and −46° C. for 48 hours. The lyophilized nanoparticles were stored in a desiccator.

The zeta potential of the dialyzed nanoparticles was determined to be −22.4+−1.9 mV, the effective diameter after dialysis was 190±1 nm, and the loading efficiency of Cr (III) was 77.4%.

Bottle tests were conducted at 40° C. in oven using glass vials with cap (20 mL). Samples of gelant solution were prepared adding to the 20 mL glass vial the appropriate weight of nanoparticles loaded with chromium to get 100 ppm of Cr (III) in the final solution, the appropriate weight of ALCOFLOOD® 935 (Lot #A2247BOV, average Mw=6,000 kDa) aqueous solution (10,000 ppm, 2% NaCl, 10 ppm $NaN_3$) and deionized water added to arrive at a concentration of 5,000 ppm ALCOFLOOD® 935 in the final solution. The nanoparticles and the liquid phase were hand-mixed until visual homogeneous dispersion. Duplicate gelant samples were prepared and labeled as 1A and 1B.

The control solution was prepared hand-mixing in a 20 mL glass vial 10.0 g of a 200 ppm Cr(III) (from $CrCl_3 \cdot 6H_2O$, Mw=266.45, Fisher Scientific) fresh aqueous solution with 10.0 g of a 10,000 ppm ALCOFLOOD® 935 (Lot #A2247BOV, average Mw=6,000 kDa), 2% NaCl, 10 ppm $NaN_3$ aqueous solution. The sample was labeled as control.

A Brookfield Digital Viscometer Model LVDV-1+CP was used to monitor the viscosity changes of gelant solutions and determine the gel time of the gelant solutions. The gelation process was monitored as a function of time starting from the point of visual homogeneous dispersion. The gel time is defined as the time required for the viscosity of the gelant at 25° C. to reach a value larger than 1028 cP at a shear rate of 2.25 $s^{-1}$. The temperature of the viscometer was controlled at 25° C. during the measurements.

Table 1 shows viscosity (cP) changes at 11.25 $s^{-1}$ as a function of time (minutes) for the evaluated samples:

TABLE 1

| | Viscosity Versus Aging Time | | | | | |
|---|---|---|---|---|---|---|
| Sample | Viscosity, cP, t = 0 min | Viscosity, cP t = 32 min | Viscosity, cP t = 4,320 min | Viscosity, cP t = 5,760 min | Viscosity, cP t = 7,200 min | Viscosity, cP t = 9,000 min |
| Control | 32.5 | >205.6 | | | | |
| 1A | 37.0 | 37.0 | 41.7 | 48.8 | 50.9 | >205.6 |
| 1B | 38.8 | 38.8 | 42.7 | 45.8 | 51.5 | >205.6 |

The control sample had a gelation time of about 32 minutes. The gelation time of the samples 1A and 1B was the same (about 9,000 minutes=6 days) as well as the viscosity increase behavior. The gelation time of 1A and 1B samples is about 280 times longer than the gelation time of the control sample. However, it was still only about 150 hours or less than one week.

In this prior art example from U.S. Pat. No. 7,644,764, a PEC delayed gelling agent was made without metal ions. First, a solution comprising 9,997 ppm PEI (100.63 g) was formed, and a separate solution comprising the 9,991 ppm DS (46.94 g) was formed. A polyelectrolyte complex solution was prepared by mixing the two solutions together. Then, the polyelectrolyte solution was mixed with varying amounts of the ALCOFLOOD® 935 at 40° C. In particular, sample G4 (comprised of 5015 ppm ALCOFLOOD® 935 and 29.8% of the PEI/DS nanoparticles solution) produced a gel after 12 incubation days.

Positively Charged PEC

To make a positively charged PEC, 10 g 0.25% (w/w) polyethylenimine (PEI, Mw 800D, pH 9.11), 1 g 0.25% poly(vinylsulfonic acid, sodium salt) (PVS) obtained from Sigma Aldrich solution were mixed at 1200 rpm rate followed by the addition of 0.2 g of 15% Zirconium in dilute acetic acid. The solution was stirred for another 5 minutes at 600 rpm.

Negatively Charged PEC

For negative PEC particles, 1 g 0.25% (w/w) PEI, Mw 800 Da, pH as prepared (about 10.8), and 12 g 0.25% PVS solution were mixed at 1200 rpm stirring followed by the addition of 0.35 g of 1.5% zirconium in dilute acetic acid. The solution was stirred for another 5 minutes at 600 rpm.

PEI amount is less in negatively charged PEC than in positively charged PEC. The binding of Zr to PEC nanoparticle strongly depends on the interaction between PEI and Zr. Therefore, lower stock concentration of Zr is required to prepare stable negatively charged PEC.

Characterization of Pec Nanoparticles

Zeta potential is a scientific term for electrokinetic potential in colloidal systems. The significance of zeta potential is that its value can be related to the stability of colloidal dispersions. The zeta potential indicates the degree of repulsion between adjacent, similarly charged particles (polyelectrolytes) in dispersion. For molecules and particles that are small enough, a high zeta potential will confer stability, i.e., the solution or dispersion will resist aggregation. When the potential is low, attraction exceeds repulsion and the dispersion will break and flocculate. Thus, colloids with high zeta potential (negative or positive) are electrically stabilized while colloids with low zeta potentials tend to coagulate or flocculate.

Particle size is also important for delayed gelling agents, since the particles need to penetrate deep within reservoirs. Thus, a particle size of less than one micron is preferred, especially about 100-900 nm average diameter, or about 150 nm to about 300 or 400 nm.

The particle size and zeta potential of the PEC nanoparticles were measured using a ZetaPALS zeta potential analyzer (Brookhaven Instruments Corp.) by dynamic and phased analysis light scattering experiments. When measuring the mean size of nanoparticles, three consecutive 1 minute measurements were obtained by detecting light scattering at a 90° angle. For zeta potential measurement, 1.5 mL of 1 mM KCl solution was mixed with eight drops of nanoparticle solution. The zeta potential was calculated from electrophoretic mobility using the Smoluchowski approximation.

Determination of Zr Entrapment

Zirconium concentrations of PEC were determined by digesting the PEC solution with 2% nitric acid. The emission of oxidized Zr was then measured at wavelength 339 nm using a Perkin-Elmer ICP-AES spectrometer. The entrapment efficiency of Zr was calculated as follows using the Zr concentration of the prepared PEC nanoparticle sample and the free Zr concentration in the supernatant after the PEC nanoparticles are centrifuged at 14800 rpm for 90 minutes.

$$\text{Entrapment efficiency} = \frac{[Zr^{4+}]_0 - [Zr^{4+}]_s}{[Zr^{4+}]_0} * 100\% \tag{1}$$

where $[Zr^{4+}]_0$ represents the concentration of Zr(IV) in PEC nanoparticle solution and $[Zr^{4+}]_s$ is the concentration of the free Zr(IV) in the supernatant solution.

Gelant Preparation

A 2% HPAM stock solution was prepared by dissolving solid HPAM in a cold solution of NaCl and 800 ppm $NaN_3$ followed by stirring for 48 hours to ensure complete hydration of polymer. The HPAM stock solution was then filtered through a 5 μm nylon filter under a driving pressure of 16 psi.

For the HPAM delayed gelation test, gelant preparation and gelation were performed in an anaerobic chamber (COY Laboratory Products, Inc. Grass Lake, Mich.) under closely controlled anaerobic conditions. A solution of gelant was prepared by mixing the required amount of PEC and HPAM with sufficient amount of brine or RO water. The prepared gelant was stirred at 700 rpm for a few minutes until a homogeneous solution was obtained. Then the gelant was divided into several portions and incubated in an oven or a heating block at constant temperature and allowed to gel under anaerobic conditions.

Brines

Synthetic field brine and seawater were prepared according to the compositions shown in Table 2.

TABLE 2

| Synthetic Field Brine (FB) and Seawater (SW) Compositions | | |
|---|---|---|
| Component | Field brine (g/kg) | Seawater (g/kg) |
| NaCl | 22.982 | 26.518 |
| KCl | 0.151 | 0.725 |
| $CaCl_2 \cdot 2H_2O$ | 0.253 | 1.141 |
| $MgCl_2 \cdot 6H_2O$ | 1.071 | 2.447 |
| NaBr | | 0.083 |
| MgSO4 | | 3.305 |
| $Na_2SO_4$ | 0.145 | |
| $NaHCO_3$ | 2.706 | 0.202 |
| Water | 972.692 | 965.579 |

Gel Time and Viscosity Measurement

The viscosity and the gelling time were measured using a Brookfield digital viscometer (Model DV-II+ Pro). The viscosity of the gelant measured at 25° C. was determined at several shear rates. The gel time is defined as the time required for the viscosity of the gelant at 25° C. to reach a value larger than 1028 cP at a shear rate of 2.25 $s^{-1}$.

Cytotoxicity Assay

The cytotoxicity of PEI was determined using the CellTiter 96® AQueous Cell Proliferation Assay System (MTS assay) from Promega. A549 cells were loaded into 96-well-plates with approximately 8,000 cells per well and incubated in a humid 5% $CO_2$ incubator at 37° C. After 18-24 h incubation, the medium was removed and the cells were washed with 100 µl of serum free-medium. Cells were then treated with the PEI solutions for 16 h. The serum-free media was removed and replaced with 100 µl of fresh media with 20 µl of the MTS reagent solution. The cells were incubated for 2 h at 37° C. in a 5% $CO_2$ incubator.

Cell viability was assessed by measuring the absorbance at 490 nm using a plate reader (SpectraMax M5) and expressed as the percentage of viable cells treated PEI normalized to viable control cells in the absence of PEI.

Figure 2:
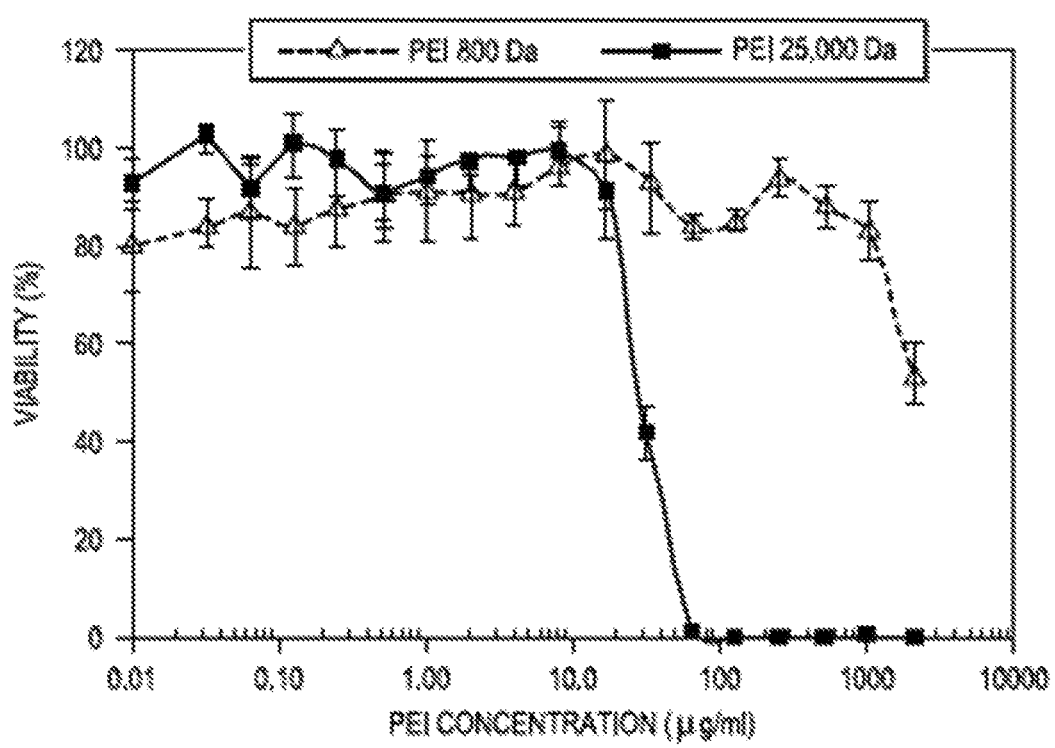
FIG. 2. Cytotoxicity of PEI 800D and PEI 25,000 D. The lower molecular weight PEI is much less toxic than the PEI of larger average molecular weight.

According to the results (shown in FIG. 2), the IC50 of PEI 25 kD was 30 µl/ml in the A549 cell lines, while the IC50 of PEI 800D was never reached, even at concentrations more than 69 times higher (>2750 µg/ml). The concentrations of PEI 800D used in our study were much lower (48-84 µg/ml) and thus are much lower than the IC50, indicating their lack of toxicity.

Optimized Pei/Pvs-Zr Characterization Data

Characterization data including size, zeta potential, Zr loading concentration, and Zr entrapment efficiency of optimized positively and negatively charged PEC are shown in Table 3. The loading of Zr depends on the amount of PEI. Because the concentration of PEI in negatively charged PEC is much lower than in positively charged PEC, the loading of Zr is less in negatively charged PEC than in positively charged PEC.

TABLE 3

| | Summary of characterization results for positively and negatively charged PEI | | | |
|---|---|---|---|---|
| Charge type | Size (nm) | Zeta potential (mV) | Zr loading (ppm) | Zr entrapment efficiency (%) |
| [+] | 397.7 ± 47 | 29.78 ± 1.04 | 2600 | 99 |
| [−] | 392.2 ± 49.6 | −50.36 ± 0.68 | 385 | 95 |

Delayed Gel Formation

In this study, gelation tests were performed with partially hydrolyzed polyacrylamide (HPAM) from three providers: ALCOFLOOD® 935 (Mw=6000 kDa) was obtained from CIBA SPECIALTY CHEMICALS, AN907 from SNF INC., and ALCOMER® 24 from BASF CORP. Comparing the viscosities measured at 25° C. with the same HPAM concentrations, it is believed that the average molecular weight of these polymers is ranked as AN907 (10-13 MDa)>ALCOMER® 24 (~6.6 MDa)>ALCOFLOOD® 935 (~6 MDa).

Figure 3A:
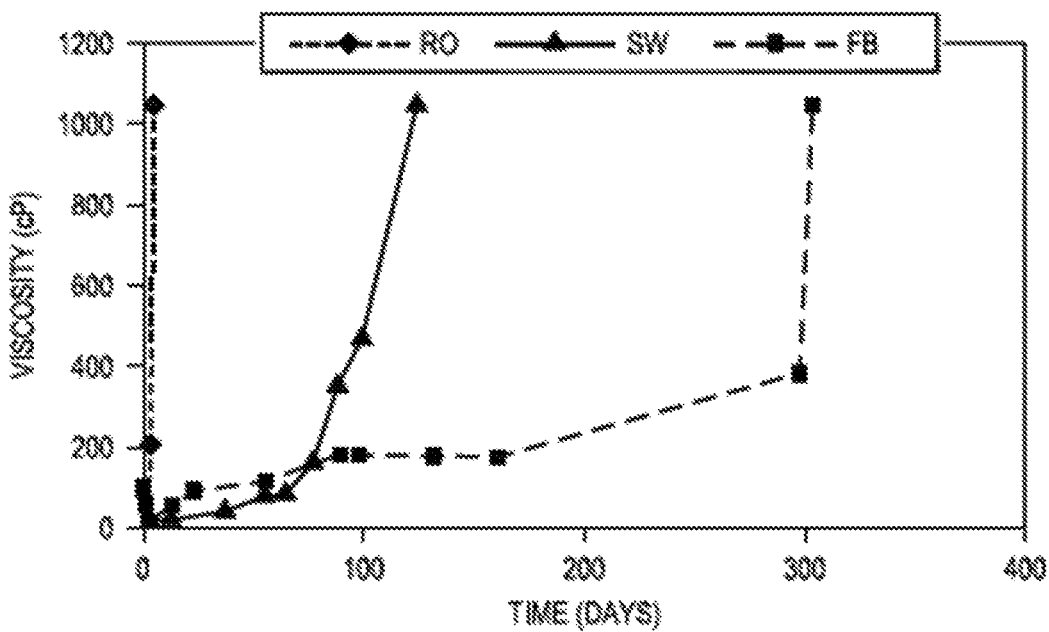
FIG. 3A-C. Gelation profiles for ALCOFLOOD® 935 with PEI 800D/PVS-Zr positively charged PEC in RO water (RO), field brine (FB) and seawater (SW) at FIG. 3A 65° C., FIG. 3B 101° C., and FIG. 3C 118° C. Final concentrations of ALCOFLOOD® 935 and Zr in gelant are 5000 ppm and 100 ppm respectively. Gelants were prepared and incubated under anaerobic conditions. Shear rate was 7.5 $s^{-1}$ for gelants having viscosities below 50 cP, 4.5 $s^{-1}$ for gelants having viscosity between 50 to 100 cP, and 2.25 $s^{-1}$ for gelants having viscosity between 101 to 1028 cP.
Figure 3B:
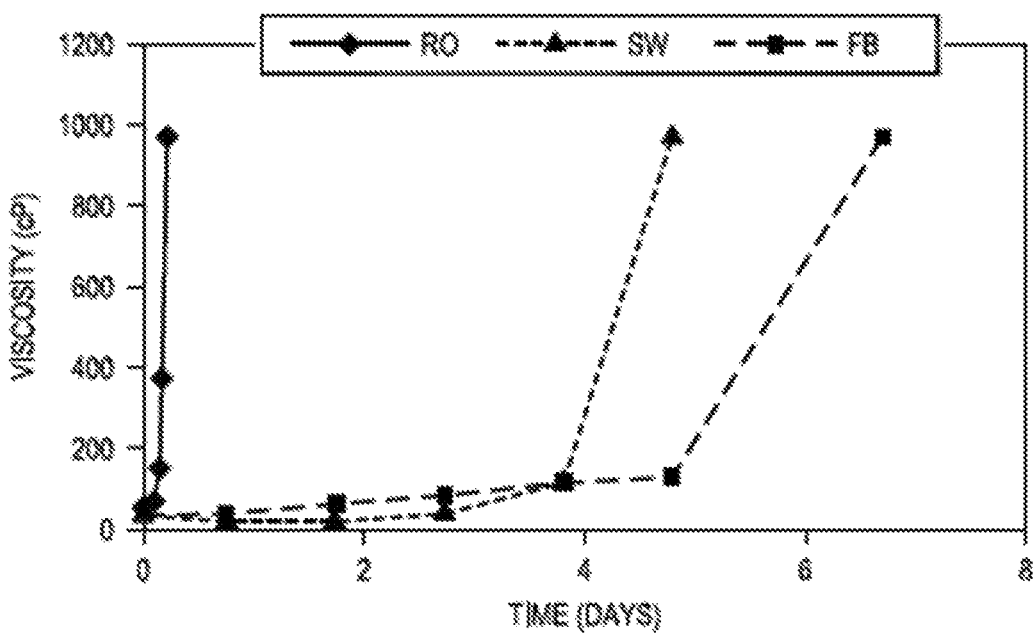
Figure 3C:
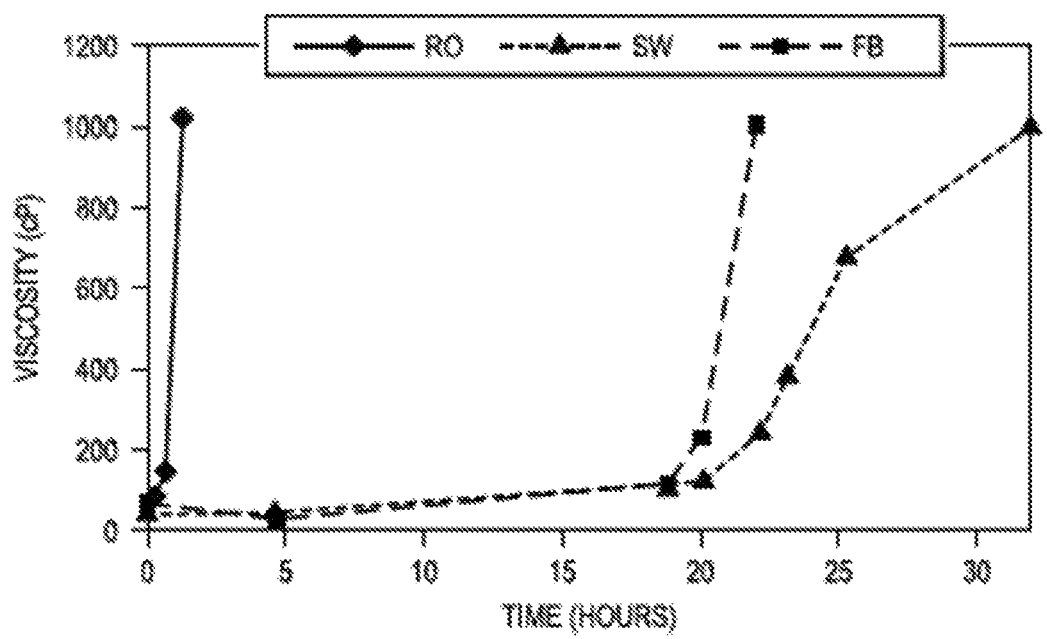
Figure 4:
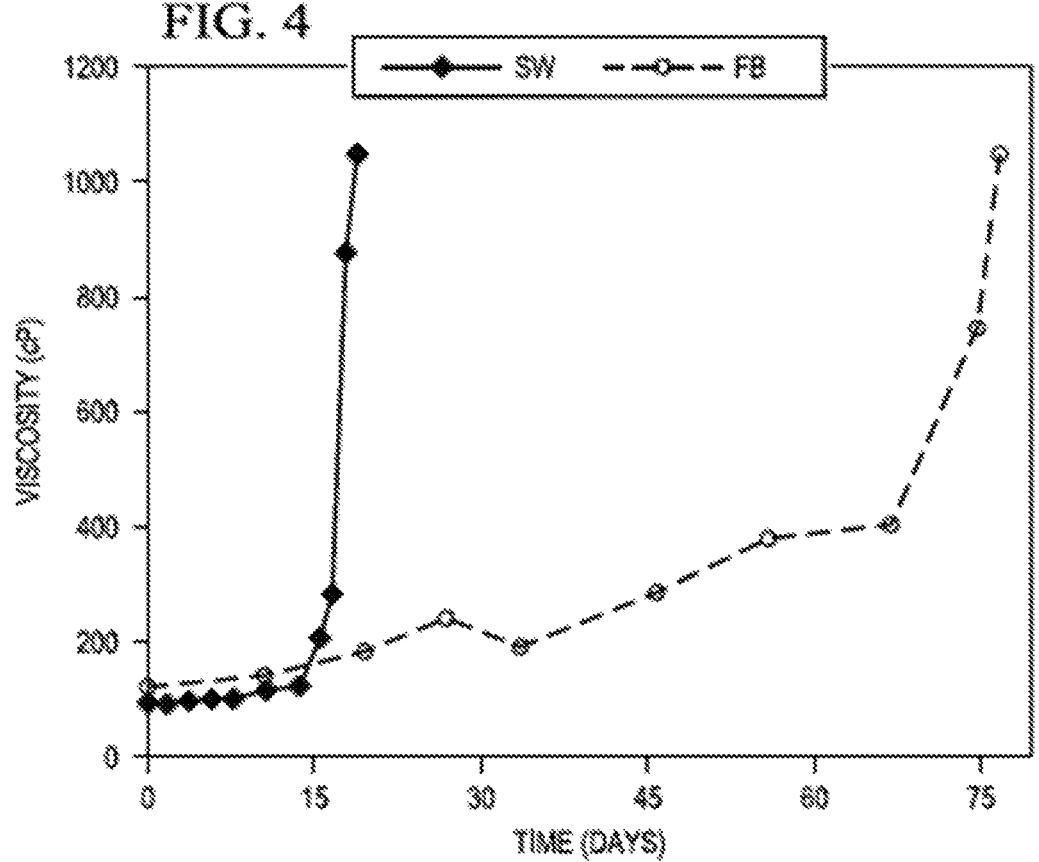
FIG. 4. Gelation profiles of PEI800D/PVS-Zr [+] PEC with 5000 ppm AN907 in field brine (FB) and seawater (SW) at 65° C. Shear rates are the same as in FIG. 3. Gel time decreases with increasing salt concentration.
Figure 5:
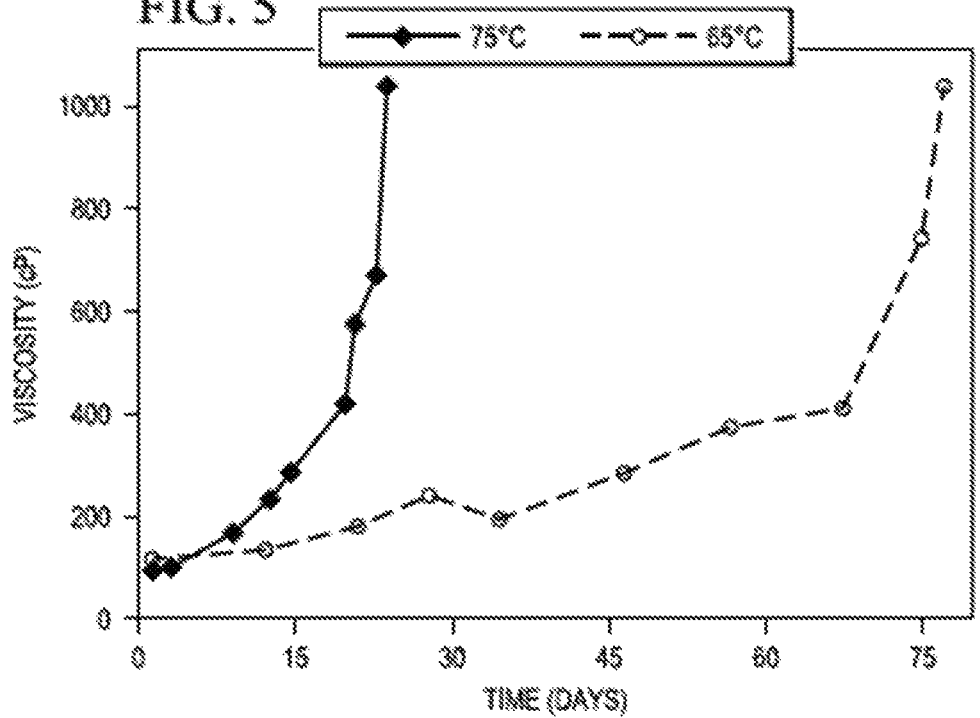
FIG. 5. Gelation profiles of PEI800D/PVS-Zr [+] PEC with 5000 ppm AN907 in field brine at 65° C. and 75° C. Shear rates as in FIG. 3. Gelation time decreases with increasing temperature.
Figure 6A:
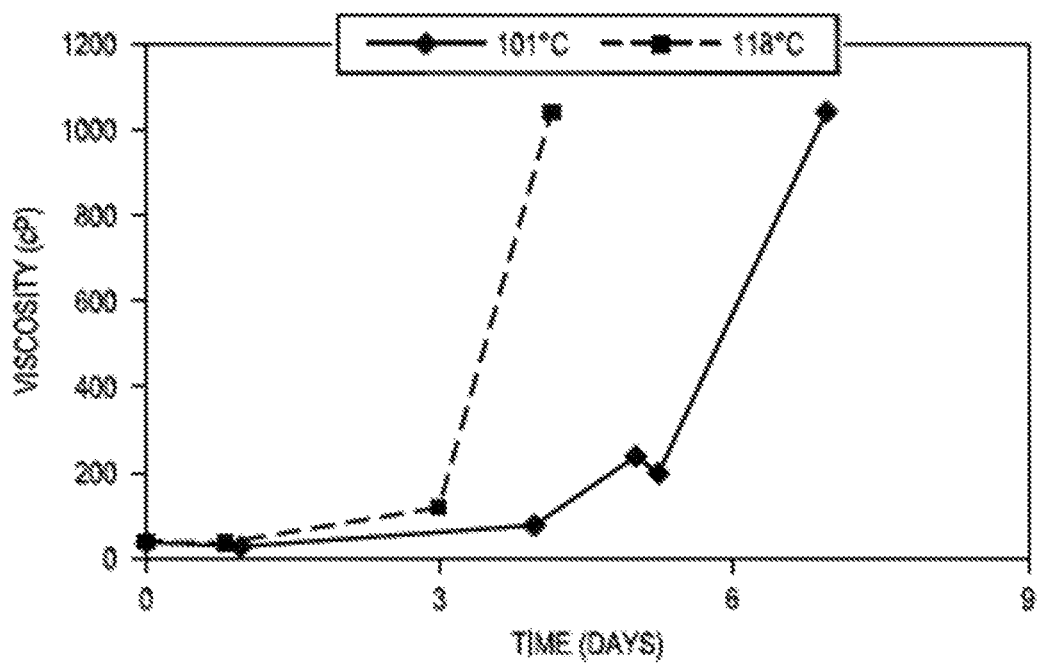
Figure 6B:
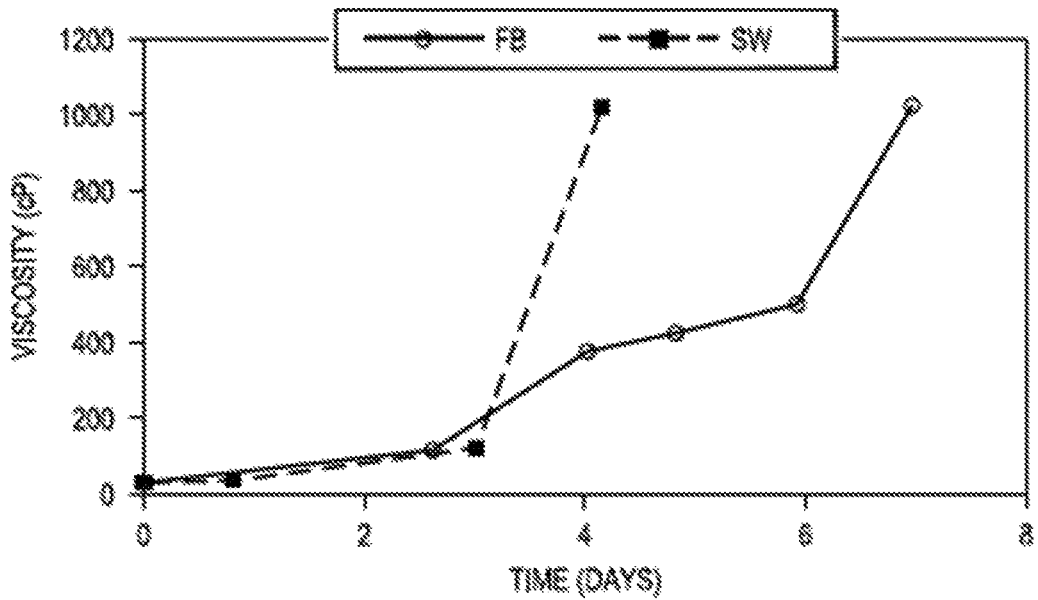

Gelation profiles for ALCOFLOOD® 935 with PEI 800D/PVS-Zr positively charged PEC in RO water (RO), field brine (FB) and seawater (SW) at (A) 65° C. (B) 101° C. (C) 118° C. are shown in FIG. 3. In this study, the final concentrations of ALCOFLOOD® 935 and Zr in gelant were 5000 ppm and 100 ppm respectively. Gelants were prepared and incubated under anaerobic conditions. Shear rate was 7.5 $s^{-1}$ for gelants having viscosities below 50 cP, 4.5 $s^{-1}$ for gelants having viscosity between 50 to 100 cP, and 2.25 $s^{-1}$ for gelants having viscosity between 101 to 1028 cP. As can be seen, gelation time is inversely proportional to temperature, and directly proportional to salt concentration, as expected. See also, FIGS. 4, 5, and 6A-C.

Table 4 shows a summary of gelation times for 5000 ppm ALCOFLOOD® 935 with positively and negatively charged PEI 800D/PVS-Zr PECs in RO water (RO), seawater (SW), and field brine (FB) at 118° C., 101° C., and 65° C. Zr concentration equals to 100 ppm. A wide range of gelation time from 5.4 hours at 101° C. to 304 days at 65° C. was achieved by varying salt concentration, temperature, and charge type of PEC.

TABLE 4

| Gelation Time Summary for 5000 ppm ALCOFLOOD ® 935 | | | | |
|---|---|---|---|---|
| Incubation temperature | Charge type | FB | SW | RO |
| 118° C. | [+] | ~22 h | ~32 h | ~1.25 h |
| | [−] | ~6.9 d | ~4.2 d | |
| 101° C. | [+] | ~7 d | ~5 d | ~5.4 h |
| | [−] | ~11 d | ~7 d | |
| 65° C. | [+] | ~304 d | ~125 d | ~6 d |

In Table 5, the HPAM source was ALCOFLOOD® 935. We repeated the experiments with the polymers from different sources. Table 5 shows a summary of gelation times for HPAM, including ALCOFLOOD® 935, AN907, and ALCOMER® 24, with positively and negatively charged PEI 800D/PVS-Zr PECs in RO water (RO), seawater (SW), and Field brine (FB) at 118° C., 101° C., 75° C., 65° C. and 50° C.

Recall that AN 907 has a higher Mw than ALCOMER® 24, which has a higher Mw than ALCOFLOOD® 935. Thus, it can be seen that these results suggest it is possible to further delay gelation time by using lower molecular weight polymer to form gels in situ. In general, the higher the temperature, the shorter the delay. Also, longer delays were seen with field brine A than with sea water.

TABLE 5

| Gelation Time Summary for Various HPAM Samples | | | | | | | |
|---|---|---|---|---|---|---|---|
| PEC surface charge | Brine Type | Incubation Temperature (° C.) | | | | | HPAM & conc. |
| | | 50 | 65 | 75 | 101 | 118 | |
| [+] | RO | | 6 d | | 5.4 h | 1.25 h | AF935 5000 ppm |
| | | | 11.1 d | | | | AN907 7000 ppm |
| | | | 15.8 d | | | | AC24 7000 ppm |
| | | | 18 d | | | | AF935 7000 ppm |

TABLE 5-continued

Gelation Time Summary for Various HPAM Samples

| PEC surface charge | Brine Type | Incubation Temperature (° C.) | | | | | HPAM & conc. |
|---|---|---|---|---|---|---|---|
| | | 50 | 65 | 75 | 101 | 118 | |
| | FB | | 304 d | | 6.7 d | 2.7 d | AF935 5000 ppm |
| | | | 77 d | 23 d | | | AN907 5000 ppm |
| | | | 43.7 d | | | | AN907 7000 ppm |
| | | | | 53.7 d | | | AC24 5000 ppm |
| | | | | 39.7 d | | | AC24 7000 ppm |
| | SW | | 125 d | | 4.8 d | 2.9 d | AF935 5000 ppm |
| | | | 19 d | | | | AN907 5000 ppm |
| | | | 11 d | | | | AN907 7000 ppm |
| | | | 55 d | | | | AC24 7000 ppm |
| [−] | FB | | | | 10.8 d | 6.9 d | AF935 5000 ppm |
| | SW | | | | 10.9 d | 4.2 d | AF935 5000 ppm |
| | | | | | | | AN907 5000 ppm |

Figure 7:
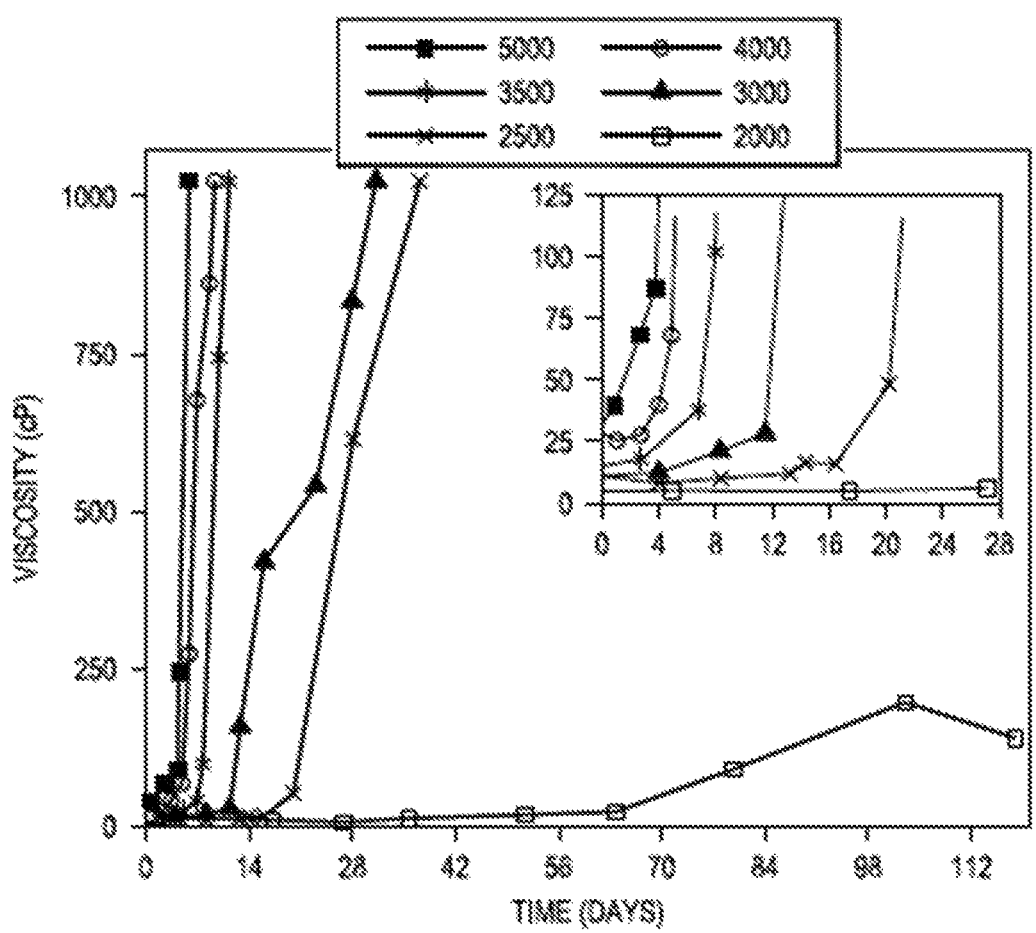
FIG. 7. Gelation profiles of PEI 800D/PVS-Zr [+] PEC with various concentrations (2000-5000 ppm) of ALCOFLOOD® 935 in RO water. The inset shows enlarged view from day 1 to day 28. Final Zr concentration was 100 ppm. Gelants were incubated at 65° C. Shear rates are the same as in FIG. 3A-C.

The effect of HPAM concentration on the HPAM gelation is shown in FIG. 7, which shows that gelation time can also be extended by decreasing polymer concentration. This is because, at higher polymer concentrations, intermolecular (between molecules) crosslinking through Zr bridges is more likely to occur than intramolecular (within the same molecule) crosslinking. At lower concentrations, polymer chains interact less and are less likely to form intermolecular crosslinks.

FIG. 7 shows there is no detectable gelation when HPAM concentration is below 2000 ppm with the 100 ppm Zr entrapped by positive PEI 800D/PVS-Zr PECs. The viscosity of the gelant reached a maximum value of 200 cP after 103 days of incubation, and then started to decrease for the gelant containing 2000 ppm HPAM.

From the inset of FIG. 7, we can see an extension of the low viscosity period when HPAM concentration is decreased. The time required to reach 100 cP can be extended from 4 days with 5000 ppm HPAM to 20 days with 2500 ppm HPAM. Therefore, an extended period of low viscosity prior to gelation can be obtained by keeping the concentration of HPAM lower in the gelant.

Gel Strength

Gel strength was visually assessed, and photographs (data not shown) indicate that gels formed by positively charged PEC and reduced concentration of ALCOFLOOD® strong. When bottles containing gel are turned over, the viscosity is high enough to keep the gel from flowing out of the bottle under gravity.

Zr Concentration

Figure 8:
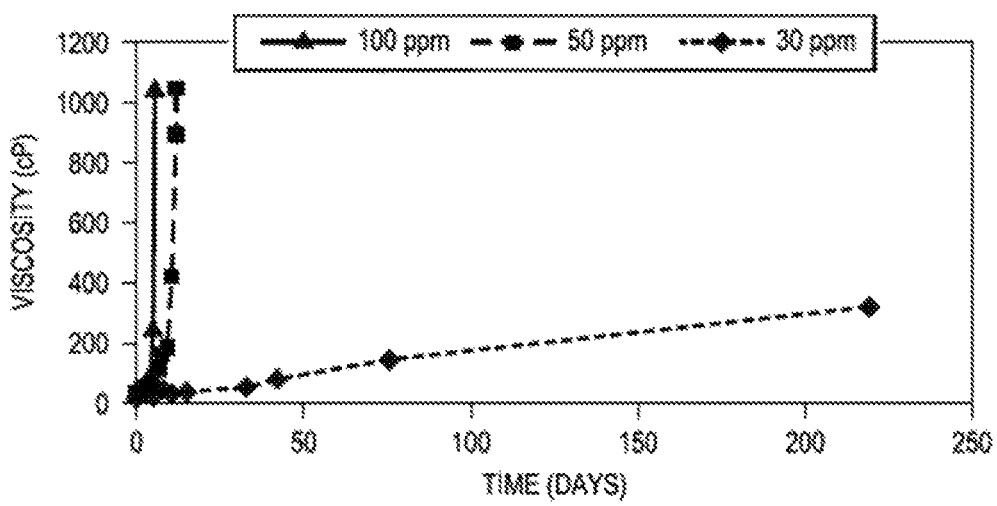
FIG. 8. Gelation of PEI 800D/PVS-Zr [+] PEC and 3500 ppm ALCOFLOOD® 935 with various final Zr concentrations (30, 50, and 100 ppm) at 65° C. Shear rates are the same as in FIG. 3.

The effect of final Zr concentration in gelant on HPAM delaying gelation was also studied. Gelant prepared with 3500 ppm HPAM, positively charged PEI 800DlPVS-Zr PEC system prepared in RO water was used. Three final Zr concentrations: 30, 50 and 100 ppm were tested. FIG. 8 shows the gelation profiles of 3500 ppm HPAM with different concentrations of Zr at 65° C. As expected, increasing the final concentration of Zr resulted in a decreased gelation time. No gelation observed with 30 ppm Zr even after 100 days of incubation at 65° C. The lowest Zr concentration required for this system is thus above 30 ppm.

Gelation Time and Mw

Our initial results suggested that gelation time could also be varied as a function of average molecular weight of the HPAM polymer, larger molecular weight polymers taking longer to gel at the same weight based ppm concentration. This is to be expected based on the above concentration data. At a given weight amount of polymer, there are fewer molecules in solution where the average molecular weight is higher, and the fewer the molecules, the longer the gelation time is predicted to be.

Figure 9:
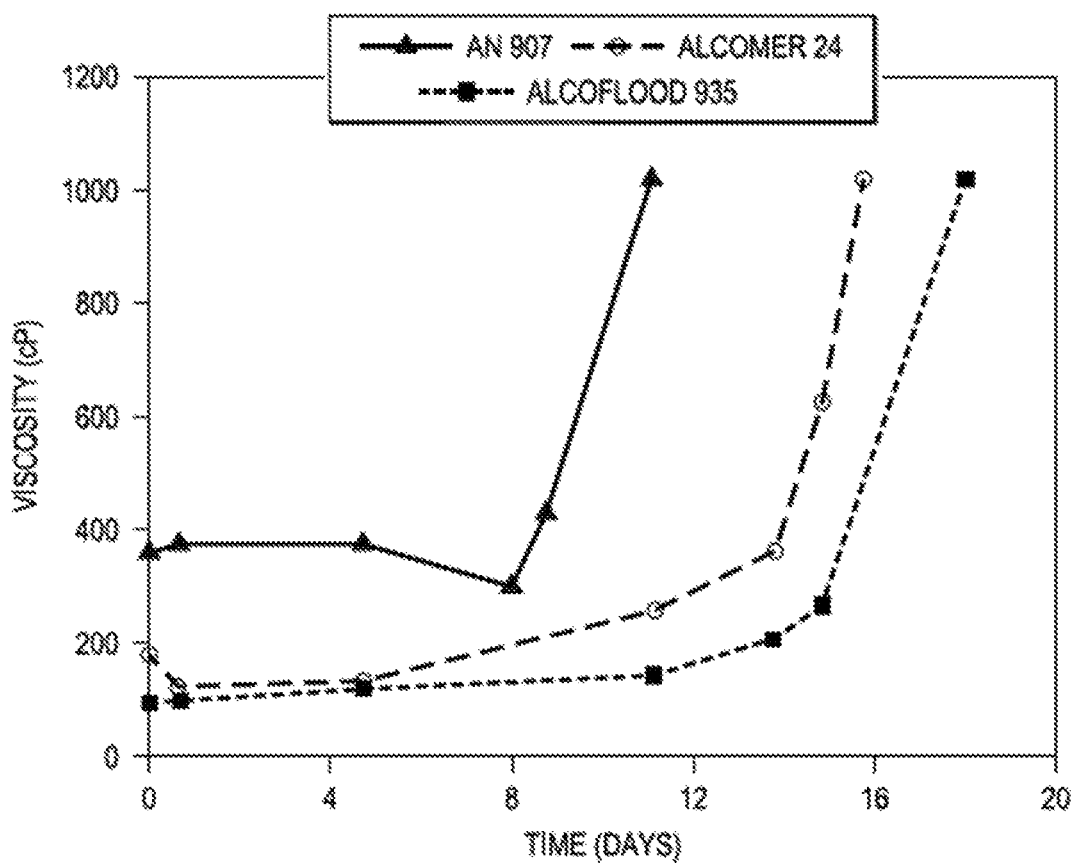
FIG. 9. Gelation tests in RO water at 50° C. Gelation profiles of PEI800D/PVS-Zr [+] PEC with 7000 ppm AN907, ALCOMER®24, and ALCOFLOOD® 935 in RO water at 50° C. Shear rate was 4.5 $s^{-1}$ for gelants having viscosity between 50 to 100 cP, and was 2.25 $s^{-1}$ for gelants having viscosity between 101 to 1028 cP.
Figure 10:
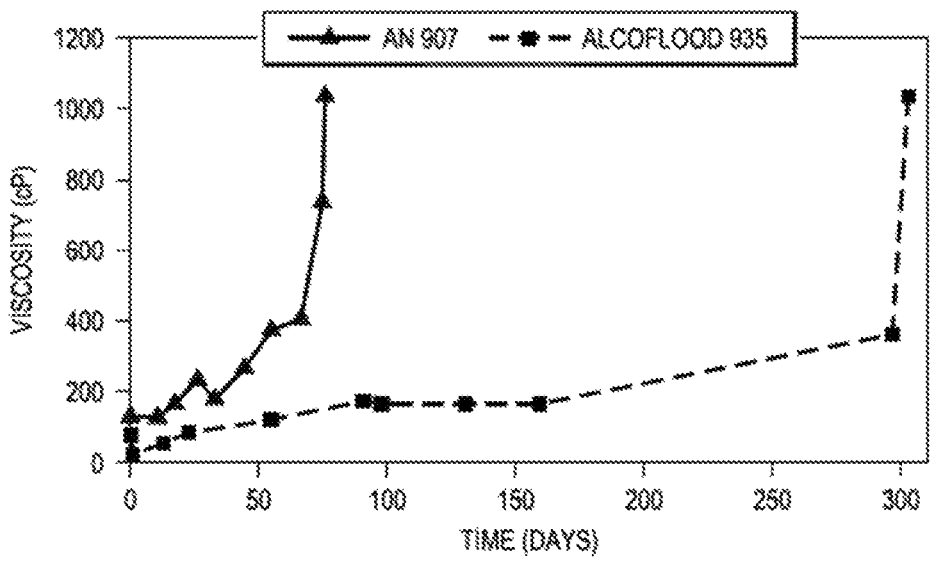
FIG. 10. Gelation tests in Field brine at 65° C. Gelation profiles of PEI800D/PVS-Zr [+] PEC with 5000 ppm HPAM polymers in FB at 65° C. Shear rate was 7.5 $s^{-1}$ for gelants having viscosities below 50 cP, was 4.5 $s^{-1}$ for gelants having viscosity between 50 to 100 cP, and was 2.25 $s^{-1}$ for gelants having viscosities between 101 to 1028 cP.

To prove this hypothesis, gelation tests of positively charged PEC entrapping Zr with different molecular weight HPAM were performed. Their gelation times in RO water (FIG. 9) at 50° C. and in field brine (FIG. 10) at 65° C. were compared. With AN907, gelation time can be shortened when compared to ALCOFLOOD® 935 HPAM. Thus, the larger the average molecular weight of the polymer, the shorter the gel time for a given weight percentage of polymer in solution.

Gel Stability

High temperature causes the hydrolysis of amide groups of HPAM, which can lead to substantial syneresis of the formed gel. Stability of gels formed by both positively and negatively charged PEC were continued incubating at 101° C. and 118° C. monitoring the formation of gel by visual observation on weekly basis.

Table 6 shows a summary of the stability of gels formed by positively and negatively charged PEI 800D/PVS-Zr PECs and ALCOFLOOD® 935 at 5000 ppm in field brine (FB) and seawater (SW) at 118 and 101° C. The thermal stability differences of gels formed by positively and negatively charged PEC may be determined by the concentration of divalent cations in field brine and seawater as well as the concentration of PEI in the gelant.

Positively charged PEC entrapping Zr forms a more stable gel than negatively charged PEC entrapping Zr in field brine. In contrast, gels formed with negatively charged PEC are more stable in seawater than gels made with positively charged PEC. Thus, each delayed gelling agent has a useful employment niche.

The gels made with positively charged PEC at 118° C. were stable for 101 days in field brine and 7 days in seawater. For gels incubated at 101° C., duration of stability can be extended to more than 257 days in field brine and 64 days in seawater.

As for negatively charged PEC the duration of stability for gels incubated at 118° C. is 13 days in field brine and 64 days in seawater. Gels incubated at 101° C. are stable for up to 87 days in field brine and 189 days in seawater.

TABLE 6

Gelation Time Summary in Brines with PECs at Various Temperatures

| | Surface charge type | Brine | Temperature | Gel Stable Time |
|---|---|---|---|---|
| PEI 800D/ PVS-Zr | Positively charged PEC | FB | 101° C. | ~257 d |
| | | | 118° C. | ~101 d |
| | | SW | 101° C. | ~64 d |
| | | | 118° C. | ~7 d |
| | Negatively charged PEC | FB | 101° C. | ~87 d |
| | | | 118° C. | ~13 d |
| | | SW | 101° C. | ~189 d |
| | | | 118° C. | ~64 d |

Delayed Pei Gelling Agent

In addition to crosslinking HPAM with PEC nanoparticles containing metal cations, such as zirconium, it is also possible to crosslink HPAM and similar carboxylate containing polymers without the use of multivalent cations. In such cases, as those with multivalent cations, PEI acts as a crosslinker of HPAM. Thus, the disclosure also includes all PEC particles made herein, but omitting the multivalent cations, and such PEC particles can still be used for delayed gelling purposes.

Positively and negatively charged PEC particles were made as described herein, but omitting the multivalent metal cation, and then tested for delay of the gelling reaction.

Figure 11:
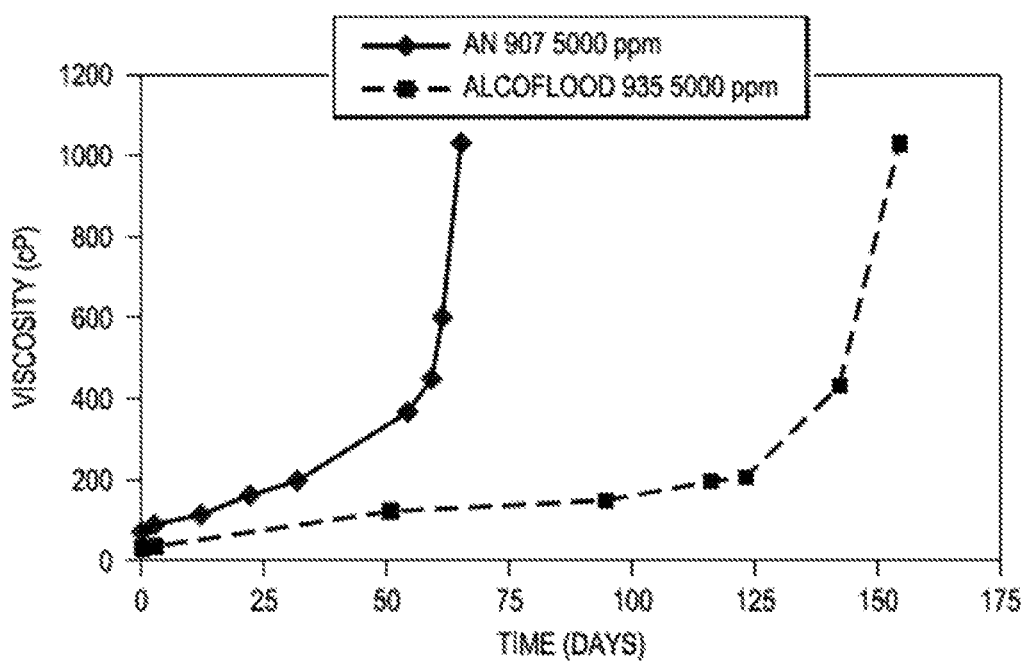
FIG. 11. Gelation tests for positively charged PEC without metal ion in field brine at 65° C. Gelation profiles of PEI800D/PVS [+] PEC with 5000 ppm HPAM polymers in FB at 65° C. Shear rate was 7.5 $s^{-1}$ for gelants having viscosities below 50 cP, 4.5 $s^{-1}$ for gelants having viscosity between 50 to 100 cP, and 2.25 $s^{-1}$ for gelants having viscosities between 101 to 1028 cP.

FIG. 11 shows the gelation results of PEI800D/PVS [+] PEC with 5000 ppm HPAM polymers in FB at 65° C. Delays of 60 and 160 days were achieved at 65° C. using AN907 and ALCOFLOOD® 935, respectively.

Figure 12:
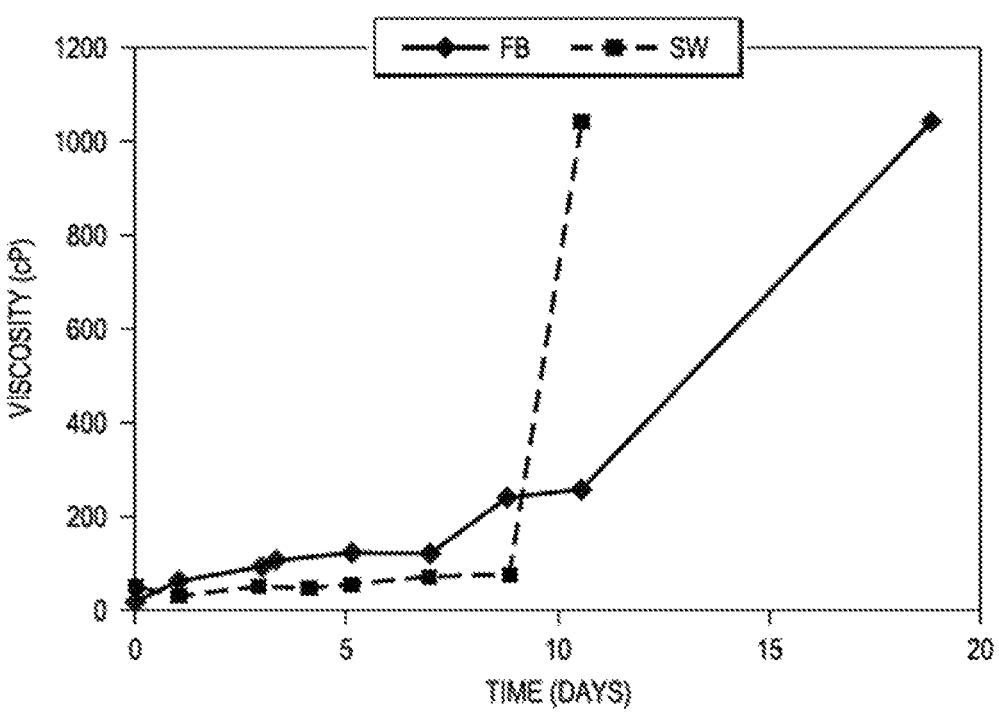
FIG. 12. Gelation tests of negatively charged PEC without metal ion in field brine (FB) and seawater (SW) at 101° C. Gelation profiles of PEI800D/PVS [−] PEC with 5000 ppm ALCOFLOOD® 935 in FB and SW at 101° C. Shear rate was 7.5 $s^{-1}$ for gelants having viscosities below 50 cP, 4.5 $s^{-1}$ for gelants having viscosity between 50 to 100 cP, and 2.25 $s^{-1}$ for gelants having viscosities between 101 to 1028 cP.

FIG. 12 shows gelation results of negatively charged PEC PEI800D/PVS [−] PEC with 5000 ppm ALCOFLOOD® 935 in FB and SW at 101° C. Delays of 10 and 20 days were achieved at this very high temperature.

FIGS. 11 and 12 show delayed gelation of positively charged and negatively charged PEC made without multivalent cations. The results show gel times shorter than with PECs containing Zr, but still significantly longer than the prior art PEI-DS particles. Further, the temperatures were much higher than those exemplified in the prior art, being 65° C. in FIG. 11 and 101° C. in FIG. 12.

In summary, prior art PEC nanoparticles were made with PEI and dextran sulphate, and loaded with Cr(III). These delayed gelling agents however, were only capable of delaying gelling for 6 days at room temperature. The prior art PEC-DS particles made without chromium could only delay gelling for 12 days at 40° C. These delays would obviously be much shorter in the much higher temperatures of a real reservoir.

In contrast with PEI and PVS, in PEC nanoparticles, the delays are much longer, even at typical reservoir temperatures. Further, we can make PEC nanoparticles that are predominantly positive or negative, simply by varying the ratio of PEI to PVS, and the differently charged PEC particles can be used in different reservoirs with different rock types, or as need for water or brine stability. Further, we have shown how gelation time can be exquisitely controlled by varying the concentration of polymer or crosslinker or by varying the molecular weight of the polymer (gel time is inversely proportional to [polymer] or [crosslinker] or Mw polymer).

Furthermore, the PEC nanoparticles described herein can be made with much lower molecular weight PEI and lack the toxicity of the prior art PEC nanoparticles, which were made with higher molecular weight PEI, shown herein to be more toxic. Additionally, the prior art PEC nanoparticles were loaded with the toxic element chromium.

Finally, the PVS is less expensive that the dextran sulfate of the prior art. While, not a major factor on a small scale, the large amounts of polymers needed for reservoir use can make this a significant difference.

Each of the following references are incorporated herein in their entirety for all purposes.
US2010056399, US2008058229, U.S. Pat. No. 7,644,764
Johnson, S., Trejo, J., Veisi, M., Willhite, G. P., Liang, J., Berkland, C., 2010, Journal of Applied Polymer Science, 115, 1008-1014.

The invention claimed is:

1. A composition comprising a polyelectrolyte complex nanoparticle comprising a polyalkylenimine of less than 2000 Da and a polyanion, said nanoparticle having a size of less than one micron.

2. The composition of claim 1, said polyelectrolyte complex nanoparticle intimately associated with a multivalent cation crosslinker.

3. The composition of claim 1, wherein said polyalkylenimine is polyethylenimine.

4. The composition of claim 1, wherein said polyanion is selected from sodium polyvinyl sulfonate, poly (sodium acrylate), poly(sodium styrene sulfonate), copolymers of sodium acrylate with sodium vinylsulfonate or sodium styrene sulfonate; dextran sulfate, and anionic surfactants.

5. The composition of claim 2, wherein said multivalent cation crosslinker is a complexed zirconium compound selected from the group consisting of zirconium acetate, sodium zirconium lactate, zirconium sulfate, zirconium tetrachloride, zirconium orthosulfate, zirconium oxychloride, zirconium carbonate, zirconium ammonium carbonate, zirconium acetylacetonate, aluminum chloride, aluminum sulfate, aluminum citrate, tin chloride, tin sulfate, iron chloride, iron nitrate, titanium chloride, and titanium sulfate.

6. The composition of claim 1, further comprising monovalent or divalent cations selected from the group consisting of sodium, potassium, magnesium or calcium ions.

7. The composition of claim 4, wherein said anionic surfactant is selected from the group consisting of sodium dodecyl sulfate, sodium lauryl sulfate, alcohol propoxy sulfate, olefin sulfonates, and alpha olefin sulfonates.

8. The composition of claim 1, wherein said polyelectrolyte complex comprised a nanoparticle with an average particle size of about 100 to 900 nm in diameter.

9. The composition of claim 1, wherein said polyelectrolyte complex nanoparticles are stable in water, field brine and seawater.

10. A composition comprising a polyelectrolyte complex nanoparticle comprising a polyalkylenimine of less than 2000 Da and polyvinyl sulfonate (PVS), said polyelectrolyte complex nanoparticle having a size of less than one micron.

11. The composition of claim 10, said nanoparticle entrapping a multivalent cation.

12. The composition of claim 11, said multivalent cation comprising Zr, Cr, Ti, Fe or Al.

13. A composition comprising a polyelectrolyte complex nanoparticle for delivery of an oil and gas chemical to a reservoir, said composition comprising a polyethylenimine of less than 2000 Da and a polyanion intimately associated with an oil and gas field chemical to form a polyelectrolyte complex, said complex having an average particle size of less than one micron.

14. A delayed gelling composition comprising:
a) a composition of claim 1;
b) a polymer than can be crosslinked with a); and
c) a fluid.

15. The composition of claim 14, where said polymer is an acrylate-based polymer.

16. The composition of claim 14, where said polymer is partially hydrolyzed polyacrylamide.

17. The composition of claim 14, where said polymer is a polymer or copolymers of acrylate, acrylamide, N,N-dimethyacrylamide, tert-butyl acrylate, acryamido-2-methylpropane sulfonic acid, sodium 2-acryamido-2-methylpropane sulfonate, or N,N, dimethyl acrylamide.

18. The composition of claim 14, where fluid is brine or seawater.

19. An improved method of sweeping a reservoir, wherein an injection fluid is injected into a reservoir to mobilize and produce oil, the improvement comprising injecting the composition claim 1 plus a polymer plus a fluid into a reservoir, aging said composition and polymer to increase its viscosity, injecting additional injection fluid into said reservoir to mobilize oil, and producing said oil.

20. A method of improving sweep efficiency of a fluid flood of a reservoir, said method comprising:
a) injecting the delayed gelling composition of claim 14 into a reservoir;
b) aging the delayed gelling composition to increase its viscosity;
c) injecting an injection fluid into said reservoir to mobilize the oil; and
d) producing said mobilized oil.

* * * * *